Patented May 14, 1935

2,001,584

UNITED STATES PATENT OFFICE 2,001,584

SUBSTITUTED MORPHOLINES AND METHOD OF MAKING THE SAME

Marion C. Reed, Cuyahoga Falls, Ohio, assignor to The B. F. Goodrich Company, New York, N. Y., a corporation of New York No Drawing. Application April 5, 1930,
Serial No. 442,043

19 Claims. (Cl. 260—27)

This invention relates to the manufacture of certain novel chemical compounds, particularly to the manufacture of compounds in which hydroxy-aryl groups are substituted on the nitrogen atoms of certain heterocyclic nuclei.

I have discovered that aminophenols will undergo a chemical reaction with certain organic halogen compounds containing two replaceable halogen atoms separated by 4, 5, or 6 other atoms such as carbon, to give hydroxy-aryl derivatives of a heterocyclic nucleus. In this reaction, the halogen atoms apparently react exclusively with the hydrogen atoms of the amino group, liberating the corresponding hydrogen halides and forming a heterocyclic nitrogen compound with a hydroxy-aryl group substituted on the nitrogen atom.

The reaction of symmetrical dichlordiethylether, ordinarily known as dichlorether, with p-aminophenol to form p-hydroxy N phenyl morpholine which may also be designated as N(p-hydroxy-phenyl) morpholine is a typical example of the general reaction described above.

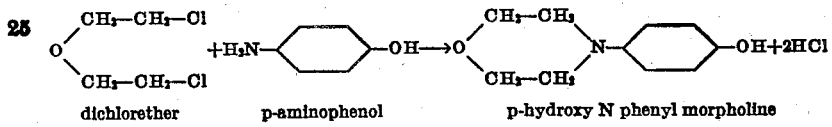

dichlorether     p-aminophenol     p-hydroxy N phenyl morpholine

In this particular reaction, as in the other reactions within the scope of this invention, a hydrogen halide is set free. The reaction is therefore preferably carried out in the presence of a substance capable of neutralizing the hydrogen halide, which, as is well known, is an acid. A caustic alkali may be added for this purpose, and gives good results. However, the reaction proceeds more readily if the acid is neutralized with a reagent which maintains the reaction mixture at all times either in a neutral or in a slightly acid condition.

Example 1.—A steam-jacketed kettle equipped with a reflux condenser is charged with 33 parts by weight of p-aminophenol and 55 parts of dichlorether (2,2' dichlordiethylether) together with 100 parts of water. Some 26 parts of sodium hydroxide are dissolved in 45 or 50 parts of water. The contents of the kettle are heated until active refluxing takes place, and the sodium hydroxide solution is gradually added. After six or seven hours the condenser is changed to remove the condensate instead of returning it, and the excess dichlorether is distilled off together with about two-thirds of the water. The p-hydroxy N phenyl morpholine crystallizes out of the solution upon cooling. The crystals are then separated from the liquor by centrifuging and may be purified by recrystallization from water or alcohol or by other suitable means. The yield is about 50% of that calculated, the greater part of the remainder of the raw materials forming tarry by-products which are quite difficult to separate completely from the p-hydroxy N phenyl morpholine.

Example 2.—A steam-jacketed kettle with a reflux condenser is charged with 33 parts by weight of p-aminophenol, 47.5 parts of dichlorether, 35.5 parts of soda ash, and 144 parts of water. The mixture is heated under the reflux for five hours, then the excess dichlorether and about 40 parts of water are removed by distillation. The mixture is cooled and the crystals of a p-hydroxy N phenyl morpholine are separated and purified as in Example 1 above. The yield is about 65%, a correspondingly lower proportion of tar being formed.

Example 3.—A steam-jacketed kettle with a reflux condenser is charged with 33 parts by weight of p-aminophenol, 45 parts of dichlorether, 30 parts of whiting (precipitated calcium carbonate), and 75 parts of water. After refluxing for eight hours the excess dichlorether is distilled off, a sufficient quantity of water being added to maintain the volume approximately constant. After the mixture is thoroughly cooled, the crystals of p-hydroxy N phenyl morpholine are separated by centrifuging and are washed with a small quantity of cold water. The product contains very little tar and can be obtained quite pure and white by a simple recrystallization or distillation. The yield averages 90% or better, the remaining 10% being largely accounted for by the solubility of the product in the mother liquor and in the wash water, as very little tar is formed. The pure product melts at 174° C.

When the product is made by the preferred method of Example 3 above it is not ordinarily necessary to purify it, since the small proportion of impurities which it contains is not found to have any objectionable consequences. Where color is important, the batch may be bleached with sodium hydrosulphite ($Na_2S_2O_4$) after the excess dichlorether or equivalent material is distilled off. The resulting product is a very pale tan color after drying and grinding to a powder.

The method described above is by no means limited to the specific substances described. Other hydroxy-aryl substituted morpholines may be made by the reaction of aminophenols with dichlorether in approximately equimolecular proportions, preferably with a slight excess (5–10%) of the dichlorether to prevent as far as possible the production of by-products of higher molecular weight. The three aminophenols (ortho, meta, or para), the aminocresols, the aminoxylenols, the hydroxy xenylamines (amino hydroxy biphenyls), the aminonaphthols, etc. undergo a reaction with the dichlorether analogous to that described above, with the formation of substituted morpholines.

Other substances may likewise be substituted for the dichlorether to produce hydroxy-aryl substituents of other heterocyclic nuclei. Thus aminophenols react with the so-called "mustard gas" (2,2' dichlordiethylsulphide) to produce hydroxy N phenyl tetra-hydrothiazines. Aminophenols with pentamethylene dichloride give hydroxy N, phenyl piperidines. Aminophenols with dichlordiethylaniline give hydroxy N,N' diphenyl piperazines. Other analogous hydroxyaryl substituted heterocyclic compounds may be made by the reaction of an aminophenol with an organic compound containing two replaceable halogen atoms separated by four, five, or six other atoms.

As indicated above, the reaction is preferably carried out in a neutral or slightly acid medium. This means that the substance employed to neutralize the halogen acid formed should react therewith readily, but should not itself possess basic properties. Sodium carbonate (soda ash) is definitely basic in reaction and apparently promotes undesirable side reactions. However, such substances as calcium or magnesium carbonate, or zinc oxide, neutralize the acid readily without rendering the reaction mixture alkaline in reaction at any time. For example, the reaction mixture described in Example 3 above was found to have an approximately constant hydrogen ion concentration corresponding to pH 4 to 4.2 (pH 7 represents neutrality, smaller numbers denoting acidity). The preferred range of acidity, between pH 3 and pH 6, is readily maintained by such compounds as those mentioned above, all of which react with the halogen acids to form soluble salts which are readily separated from the comparatively insoluble hydroxy-aryl substituted heterocyclic compounds of this invention.

The compounds of the class described above, namely, compounds containing hydroxy-aryl groups substituted on the nitrogen atoms of heterocyclic nuclei, have been found to possess an extremely wide range of usefulness in the industrial arts. They have found extensive employment as anti-oxidants, being extremely useful in retarding the deterioration of such organic substances as rubber, as described and claimed in my co-pending application Serial No. 398,104, filed October 7, 1929. They are unusually effective pickling inhibitors, possessing the property of inhibiting the solution of metals in acids, while not appreciably affecting the rate of solution of the metal oxides and other surface impurities. They are photographic developers and may be employed in the usual way in developing silver halide emulsions. They may even be used as intermediates in the manufacture of other chemical compounds such as dyestuffs or pharmaceutical chemicals.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

It will be understood that the term aminophenol, unless otherwise limited, is employed in the appended claims in a generic sense to include aromatic compounds containing both a primary amino group and a hydroxyl group substituted on an aromatic nucleus, and particularly to include all such specific compounds hereinabove enumerated. The term aryl is employed in its usual sense to refer to an aromatic ring directly connected to another portion of the molecule by a single valence bond.

I claim:

1. The method of making a compound containing a hydroxy-aryl group substituted on the nitrogen atom of a heterocyclic nucleus, which comprises heating an aminophenol with a compound of the general formula $$X-CH_2-CH_2-Y-CH_2-CH_2-X$$

wherein X is a halogen atom and Y is $CH_2$, O, S or N-aryl, and neutralizing the halogen acid formed, during the course of the reaction.

2. The method of making an N-hydroxyaryl substituted morpholine which comprises heating an aminophenol with 2,2' dichlor diethyl ether.

3. The method of making N-(p-hydroxyphenyl) morpholine which comprises heating p-aminophenol with 2,2' dichlor diethyl ether.

4. The method of making an N-hydroxyaryl substituted morpholine which comprises heating an aminophenol with 2,2' dichlor diethyl ether, and during the course of the reaction continuously neutralizing the acid formed without permitting the mixture to become appreciably alkaline.

5. The method of making an N-hydroxyaryl substituted morpholine which comprises heating an aminophenol with 2,2' dichlor diethyl ether in an aqueous medium of pH 3 to 6.

6. The method of making an N-hydroxyaryl substituted morpholine which comprises heating an aminophenol with 2,2' dichlor diethyl ether in the presence of an alkaline earth carbonate.

7. The method of making an N-hydroxyphenyl morpholine which comprises heating p-aminophenol with 2,2' dichlor diethyl ether in the presence of finely divided calcium carbonate.

8. A compound having the general formula

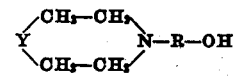

wherein R is an aromatic nucleus and Y is $CH_2$, O, S or N-aryl.

9. An N-hydroxyaryl morpholine.

10. An N-hydroxyphenyl morpholine.

11. An N-hydroxyaryl tetrahydrothiazine.

12. An N-hydroxyaryl piperidine.

13. The method of making an N-hydroxyaryl substituted tetrahydrothiazine which comprises heating an aminophenol with 2,2' dichlor diethyl sulphide.

14. The method of making an N-hydroxyaryl substituted piperidine which comprises heating an aminophenol with pentamethylene dichloride.

15. The method of making a compound containing a hydroxy-aryl group substituted on the nitrogen atom of a heteroyclic nucleus which comprises reacting an aminophenol with a 2,2' dihalogen substituted ether, and neutralizing the halogen acid formed, during the course of the reaction.

16. N (p-hydroxy-phenyl) morpholine.

17. N (p-hydroxy-phenyl) tetrahydrothiazine.

18. N (p-hydroxy-phenyl) piperidine.

19. The process of producing para-hydroxy-N-phenyl morpholine which comprises reacting in liquid phase beta, beta'-dichloro-diethyl ether and para-aminophenol in the presence of water and a mild inorganic base.

MARION C. REED.